(12) United States Patent
Okada et al.

(10) Patent No.: US 6,317,670 B1
(45) Date of Patent: Nov. 13, 2001

(54) CONTROL APPARATUS AND METHOD OF AUTOMATIC TRANSMISSION

(75) Inventors: Mitsuyoshi Okada, Hitachinaka; Hiroshi Kuroiwa, Hitachi; Toshimichi Minowa, Mito; Junichi Noda, Ibaraki-ken, all of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/450,136

(22) Filed: Nov. 26, 1999

(30) Foreign Application Priority Data

Nov. 26, 1998 (JP) .................................................. 10-335548

(51) Int. Cl.$^7$ .................................................. G06F 17/00
(52) U.S. Cl. .............................. 701/51; 701/54; 477/107; 477/115
(58) Field of Search ........................ 701/51, 54; 477/30, 477/31, 34, 107, 110, 115

(56) References Cited

U.S. PATENT DOCUMENTS 4,730,522 * 3/1988 Morimoto .............................. 701/51
5,224,398 * 7/1993 Sasaki ................................... 701/51

FOREIGN PATENT DOCUMENTS 06147304   5/1994   (JP) .
08121581   5/1996   (JP) .

* cited by examiner

Primary Examiner—William A. Cuchlinski, Jr.
Assistant Examiner—Yonel Beaulieu
(74) Attorney, Agent, or Firm—Crowell & Moring LLP

(57) ABSTRACT

A control unit and a control method of an automatic transmission can accurately estimate an output shaft torque in a torque converter with little error. The control unit of the automatic transmission estimates an output shaft torque in a torque converter with using a characteristic of the torque converter and controls the automatic transmission by using the estimated torque converter output shaft torque. At lest one of a pump capacity characteristic and a torque ration characteristic of the torque converter is corrected in the control unit by using an oil temperature of the automatic transmission and at least one of parameters expressing an operating state, thereby estimating the torque converter output shaft torque.

7 Claims, 6 Drawing Sheets

CONTROL APPARATUS AND METHOD OF AUTOMATIC TRANSMISSION

BACKGROUND OF THE INVENTION

FIELD OF THE INVENTION

The present invention relates to a control unit and a control method of an automatic transmission used for a power transmission mechanism which converts a drive force of an engine in an automotive vehicle by means of the automatic transmission so as to transmit to an axle.

As the control unit of the automatic transmission in accordance with the prior art, for example, as described in Japanese Patent Unexamined Publication No. 6-147304, there has been known a method of performing a travelling load estimation and an incline estimation on the basis of a torque estimation so as to optimally control the automatic transmission. In this method, it is structured such as to determine an input torque of a torque converter by utilizing a characteristic of the torque converter when a velocity ratio (that is, a slip ratio) of the torque converter is equal to or less than a predetermined value, determine an engine torque by utilizing a torque characteristic of the engine in an area over the value, determine both calculated values, that is, calculate the input torque and the engine torque of the torque converter substantially at the same time when both are switched (that is, at a time of switching from a torque converter characteristic method to an engine torque characteristic method), calculate a difference between the both as a torque component of auxiliary machines (comprising loads of an air conditioner, a head light, a power steering and the like), and subtracting the torque component of the auxiliary machines from the calculated engine torque so as to determine an input shaft torque. Then, by multiplying this torque of the torque converter input shaft by a torque ratio obtained on the basis of another torque converter characteristic (a torque ratio characteristic), an output shaft torque in the torque converter is calculated.

However, since the torque converter characteristic (a characteristic of coefficient of a pump capacity and a torque ratio characteristic) uses a characteristic of an oil temperature (80° C.) at which the engine and the automatic transmission are generally used, the characteristic of the torque converter changes under a state that an oil temperature before the engine is started is low and a state that an oil temperature becomes very high due to an overload operation, so that an error in calculating the torque of the torque converter output shaft is increased.

Then, for example, as described in Japanese Patent Unexamined Publication No. 8-121581, it has been known to correct the torque of the torque converter output shaft in accordance with the oil temperature of the automatic transmission.

However, in accordance with researches performed by the inventors of the present invention, it is not always sufficient to correct the torque of the torque converter output shaft on the basis of the oil temperature of the automatic transmission, and it becomes apparent there is a problem that the error of the calculated torque of the torque converter output shaft is still large.

SUMMARY OF THE INVENTION

An object of the present invention is to provide a control unit and a control method of an automatic transmission which can accurately estimate an output shaft torque in a torque converter with a further little error.

(1) In order to achieve the object mentioned above, in accordance with the present invention, there is provided a control unit of an automatic transmission having torque estimating means for estimating an output shaft torque in a torque converter with using a characteristic of the torque converter and controlling the automatic transmission by using the torque converter output shaft torque estimated by the torque estimating means, wherein the torque estimating means corrects at least one of a pump capacity characteristic and a torque ratio characteristic of the torque converter by using an oil temperature of the automatic transmission and at least one of parameters expressing an operating state, the parameters comprising a torque of an input of the torque converter, an input shaft speed in the torque converter, a relative velocity difference between the input shaft and the output shaft in the torque converter, a velocity change component of the input shaft in the torque converter, a velocity change component of the output shaft in the torque converter, a relative velocity change component of the input shaft and the output shaft in the torque converter, a driving force of the input shaft in the torque converter, a driving force of the output shaft in the torque converter, and a ratio of the driving forces between the input shaft and the output shaft in the torque converter, thereby estimating the torque converter output shaft torque.

In accordance with the structure mentioned above, since the torque converter output shaft torque is calculated by further using the parameters expressing the operating state other than the oil temperature of the automatic transmission, the error of the torque converter output shaft torque can be further reduced and it is possible to accurately estimate the torque converter output shaft torque.

(2) In the control unit of the automatic transmission defined in the item (1) mentioned above, preferably, the torque estimating means calculates the engine torque Te on the basis of an engine speed Ne and a throttle valve opening TVO.

(3) In the control unit of the automatic transmission defined in the item (1) mentioned above, preferably, the torque estimating means calculates a difference of a torque converter relative speed ΔN on the basis of a difference between an engine speed Ne and a turbine speed Nt.

(4) In the control unit of the automatic transmission defined in the item (1) mentioned above, preferably, the torque estimating means coverts an engine speed Ne into an angular velocity, calculates a velocity change component ΔVe of the engine speed Ne by taking a time differentiation, calculates a velocity change component ΔVt of the turbine speed Nt and calculates a torque converter relative velocity ratio ΔV on the basis of a difference between the velocity change component ΔVe of the engine speed Ne and the velocity change component ΔVt of the turbine speed Nt.

(5) In the control unit of the automatic transmission defined in the item (1) mentioned above, preferably, the torque estimating means calculates an engine torque Te on the basis of an engine speed Ne and a throttle valve opening TVO, calculates a driving force Le of a torque converter input shaft by multiplying the calculated engine torque Te by an angular velocity ωe of the torque converter input shaft, calculates a driving force Lt of a torque converter output shaft by multiplying a pump capacity coefficient Cp0 and a torque ratio t0 calculated on the basis of a velocity ratio e between the engine speed and the number of rotation in the torque converter by a square value $Ne^2$ of the engine speed and an angular velocity ωt of the torque converter output shaft, and calculates a torque converter driving force ratio R on the basis of a ratio between a driving force Le of the torque converter input shaft and a driving force Lt of the torque converter output shaft.

(6) In order to achieve the object mentioned above, in accordance with the present invention, there is provided a control method of an automatic transmission comprising steps of estimating an output shaft torque in a torque converter with using a characteristic of the torque converter and controlling the automatic transmission by using the estimated torque converter output shaft torque, wherein the improvement comprises a step of correcting at least one of a pump capacity characteristic and a torque ratio characteristic of the torque converter by using an oil temperature of the automatic transmission and at least one of five parameters expressing an operating state, the parameters comprising a torque of an input of the torque converter, an input shaft speed in the torque converter, a relative velocity difference between the input shaft and the output shaft in the torque converter, a relative velocity change of the input shaft and the output shaft in the torque converter, and a ratio of driving forces between the input shaft and the output shaft in the torque converter, thereby estimating the torque converter output shaft torque.

In accordance with the method mentioned above, since the torque converter output shaft torque is calculated by further using the parameters expressing the operating state other than the oil temperature of the automatic transmission, the error of the torque converter output shaft torque can be further reduced and it is possible to accurately estimate the torque converter output shaft torque.

DESCRIPTION OF THE PREFERRED EMBODIMENTS

A description will be given below of a structure of a control unit of an automatic transmission in accordance with an embodiment of the present invention below with reference to FIGS. 1 to 14.

At first, a whole structure of the control unit of the automatic transmission in accordance with the present embodiment will be described with reference to FIG. 1.

Figure 1:
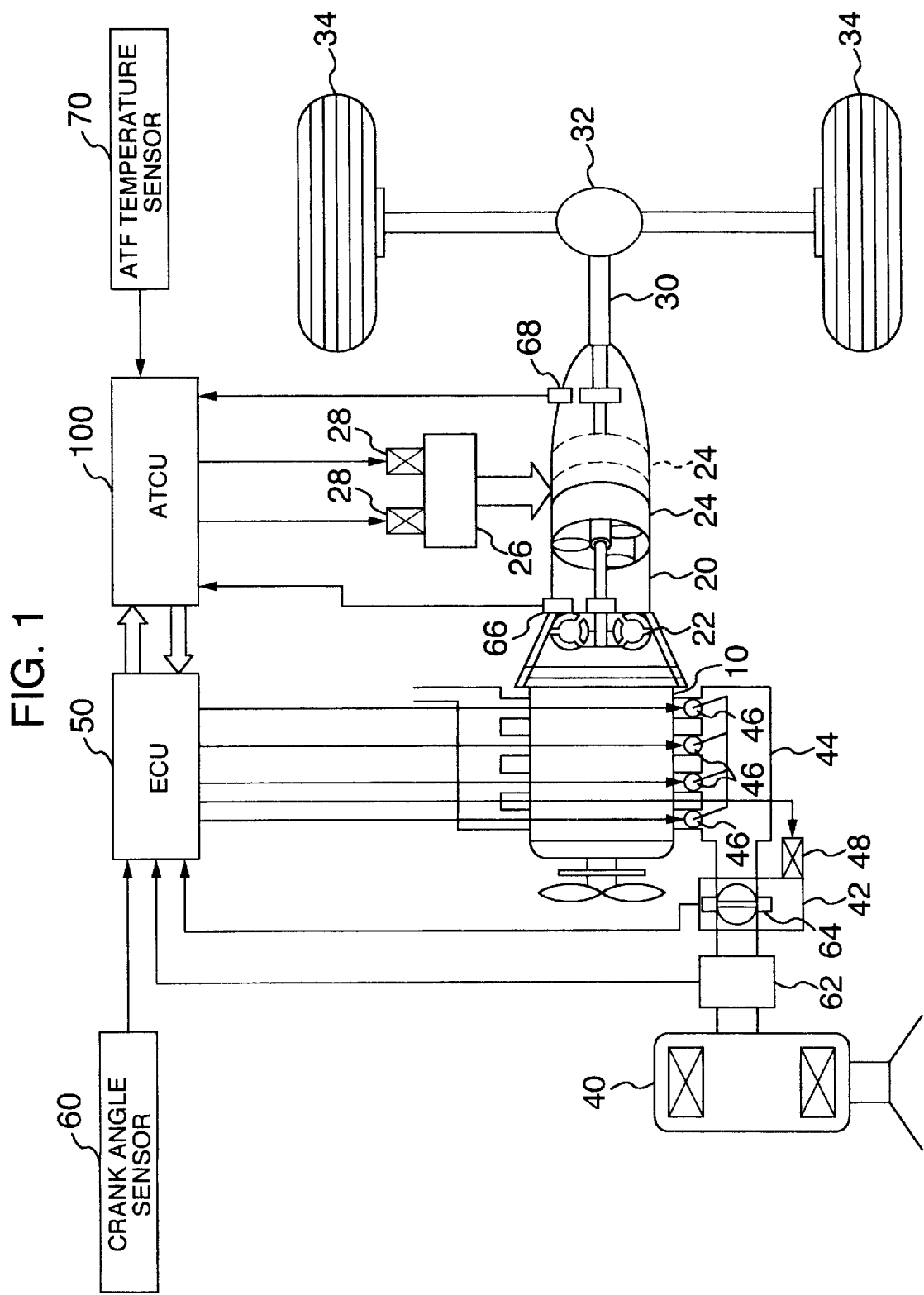
FIG. 1 is a systematically schematic view which shows a whole structure of a control unit of an automatic transmission in accordance with an embodiment of the present invention.

FIG. 1 is a systematically schematic view which shows a whole structure of the control unit of the automatic transmission in accordance with an embodiment of the present invention.

A driving force of an engine 10 is shifted by an automatic transmission (AT) 20 so as to be transmitted to a drive wheel 34 via a propeller shaft 30 and a differential gear commonly serving as a final reduction gear.

An inner portion of the AT 20 is further separated into a torque converter 22 and a gear train 24. The AT 20 is controlled by an AT electronic control unit (ATCU) 100 with a built-in microcomputer. The ATCU 100 controls the AT 20 via a hydraulically controlled solenoid valve 28 of a hydraulic circuit 26.

A suction amount of an air sucked from an air cleaner 40 is controlled by a throttle controller 42. An injector 46 is mounted to a suction air manifold 44 so as to inject a fuel to the sucked air.

In an engine electronic control unit (ECU) 50 with a built-in microcomputer, there are input sensor information concerning a crank angle sensor 60, an air flow sensor 62 for detecting a suction air amount, a throttle sensor 64 mounted to the throttle controller 42, an engine cooling water temperature sensor (not shown), an oxygen concentration sensor for detecting a concentration of an oxygen in an exhaust gas within an engine exhaust pipe, an exhaust gas temperature sensor and the like, and the ECU 50 executes various calculations with respect to an engine speed and the like so as to output a valve opening operation driving signal to the injector 46, thereby controlling a fuel amount, to output a valve opening operation driving signal to an idle speed control valve (ISC) 48, thereby controlling an auxiliary air amount, to output an igniting signal to an ignition plug (not shown), thereby controlling an ignition timing, and the like. Accordingly, the ECU 50 executes various controls.

Sensor information concerning a turbine sensor 66 for detecting a turbine speed, a vehicle speed sensor 68 for detecting an AT output shaft speed, an ATF (AT oil) temperature sensor 70 and the like, signals such as the engine speed and the throttle valve opening and the like from the ECU 50, and the like are input to the ATCU 100. Accordingly, the ATCU 100 executes a calculation and outputs a valve opening operation driving signal to the solenoid valve 28 for controlling a hydraulic pressure mounted in the hydraulic circuit 26.

Here, in the example mentioned above, there is shown a method of directly detecting the engine suction air amount by the air flow sensor 62, however, the present invention is not limited to this, for example, a method of calculating an air flow amount in accordance with a calculation on the basis of the pressure and the suction air temperature within the suction manifold 44, a method of calculating an air amount in accordance with a calculation on the basis of the throttle valve opening and the engine speed and the like may be employed.

Further, in the present embodiment, the structure is made such that the ATCU and the ECU are separately provided, however, the present invention is not limited to this, the ATCU and the ECU may be integrally provided.

Further, in the present embodiment, the front engine and rear drive system is employed, however, the present invention is not limited to this, a front engine and front drive system, a rear engine and rear drive system, a four wheel drive system and the like may be employed.

Next, a description will be given of a structure of torque estimating means used for the control unit of the automatic transmission in accordance with the present embodiment with reference to FIG. 2.

Figure 2:
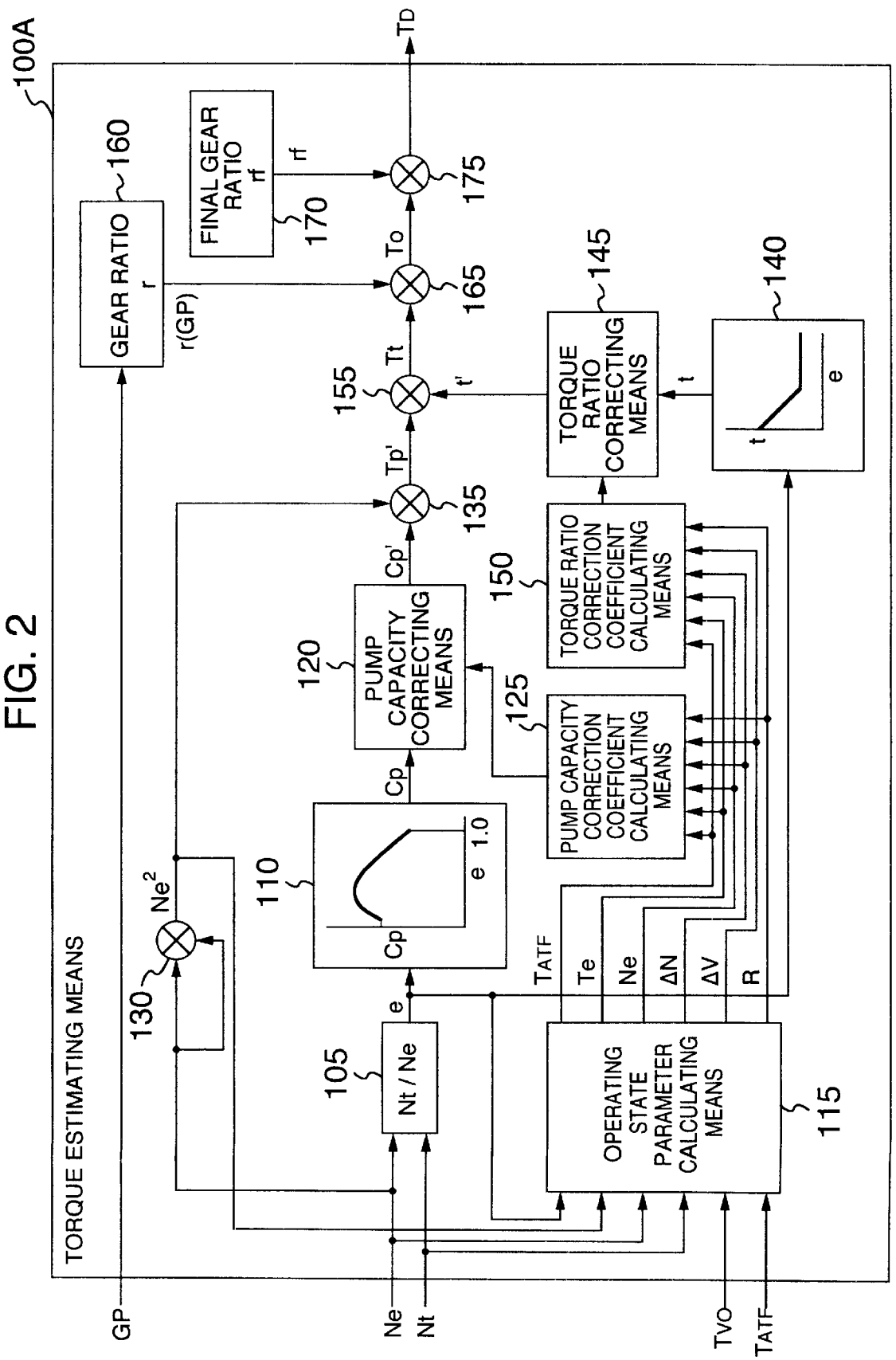
FIG. 2 is a block diagram which shows a structure of torque estimating means used for a control unit of an automatic transmission in accordance with an embodiment of the present invention.

FIG. 2 is a block diagram which shows a structure of the torque estimating means used for the control unit of the automatic transmission in accordance with an embodiment of the present invention.

Torque estimating means 100A in accordance with the present embodiment is provided in the ATCU 100 explained in FIG. 1 and is structured such as to estimate an output shaft torque of the torque converter by using a torque converter characteristic (a coefficient of a pump capacity and a torque ratio characteristic). The ATCU 100 executes a traveling load estimation and an incline estimation on the basis of an output shaft torque (a drive torque) estimated by the torque estimating means 100A so as to control an automatic transmission (AT) 20.

The torque estimating means 100A is provided with velocity ratio (e) calculating means 105, pump capacity (Cp) calculating means 110, operating state parameter calculating means 115, pump capacity correcting means 120, pump capacity correcting coefficient calculating means 125, engine speed square value calculating means 130, pump torque (Tp) calculating means 135, torque ratio (t) calculating means 140, torque ratio correcting means 145, torque ratio correcting coefficient calculating means 150, turbine torque (Tt) calculating means 155, gear ratio (r) calculating means 160, output shaft torque (To) calculating means 165, final reduction ratio storing means 170 and drive wheel torque (TD) calculating means 175.

The velocity ratio (e) calculating means 105 calculates a ratio between an engine speed Ne (an input shaft speed in the torque converter) and a turbine speed Nt (an output shaft speed in the torque converter) on the basis of the formula (1) so as to calculate a velocity ratio e of the torque converter.

$$e = Nt/Ne \quad (1)$$

The pump capacity (Cp) calculating means 110 calculates the pump capacity coefficient Cp on the basis of the velocity ratio e of the torque converter calculated by the velocity ratio (e) calculating means 105 with using a pump capacity coefficient characteristic (e-Cp characteristic) of the torque converter which is previously stored.

The operating state parameter calculating means 115 calculates, as described below, an oil temperature TATF of the AT 20, the engine torque Te, the engine speed Ne, a torque converter relative velocity difference $\Delta N$, a torque converter relative velocity ratio $\Delta V$ and a torque converter driving force ratio R corresponding to parameters showing an operation state on the basis of the engine speed Ne (the input shaft speed in the torque converter), the turbine speed Nt (the output shaft speed in the torque converter), a throttle valve opening Tvo and an oil temperature TATF of the AT 20.

At first, the operating state parameter calculating means 115 calculates the engine torque Te on the basis of the input engine speed Ne and the throttle valve opening TVO. Here, the engine torque Te becomes the torque converter input shaft torque.

Secondly, the operating state parameter calculating means 115 calculates a difference between the input engine speed (the input shaft speed in the torque converter) Ne and the turbine speed (the output shaft speed in the torque converter) Nt so as to output as a torque converter relative velocity difference $\Delta N$.

Thirdly, the operating state parameter calculating means 115 multiplies by $2\pi/60$ so as to convert the input engine speed Ne into an angular velocity and further takes time differentiation so as to calculate a velocity change component $\Delta ve$ of the engine speed Ne. In the same manner, it calculates the velocity change component $\Delta Vt$ of the input turbine speed Nt. Further, it calculates the difference between the velocity change component $\Delta Ve$ of the engine speed Ne and the velocity change component $\Delta Vt$ of the turbine speed Nt so as to output as the torque converter relative velocity ratio $\Delta V$.

In this case, in place of the torque converter relative velocity ratio $\Delta V$, it may output the velocity change component $\Delta Ve$ of the engine speed Ne or the velocity change component $\Delta Vt$ of the turbine speed Nt so as to set as the parameter for the operation state.

Fourthly, the operating state parameter calculating means 115 calculates the engine torque Te on the basis of the input engine speed Ne and the throttle valve opening TVO. On the contrary, it multiplies the engine speed Ne by $2\pi/60$ so as to calculate an angular velocity $\omega e$ of the torque converter input shaft. Then, by multiplying the calculated engine torque Te by the angular velocity $\omega e$, a driving force Le of the torque converter input shaft is obtained.

Further, a pump capacity coefficient Cp0 and a torque ratio t0 for calculating a driving force of the torque converter output shaft is calculated on the basis of the velocity ratio e calculated by the velocity ratio (e) calculating means 105 in accordance with previously stored standard pump capacity coefficient and torque ratio characteristic. Next, a turbine torque Tt0 for calculating the driving force of the torque converter output shaft is calculated by subsequently multiplying values of the calculated pump capacity coefficient Cp0 and torque ratio t0 by a square value $Ne^2$ of the engine speed Ne calculated by engine speed square value calculating means 130 mentioned below. Further, an angular velocity ωt of the torque converter output shaft is calculated by multiplying the calculated turbine speed Nt by 2π/60, and the driving force Lt of the torque converter output shaft is calculated by further multiplying the angular velocity at by the previously calculated turbine torque Tt0.

Then, a ratio between the driving force Le of the torque converter input shaft calculated in accordance with the method mentioned above and the driving force Lt of the torque converter output shaft is finally calculated, and a torque converter driving force ratio R is output.

In this case, in place of the torque converter driving force ratio R, the driving force Le of the torque converter input shaft or the driving force Lt of the torque converter output shaft may be output so as to be set as a parameter for the operating state.

In this case, fifthly and sixthly, the operating state parameter calculating means 115 outputs the input signals of the engine speed Ne (the input shaft speed in the torque converter) and the oil temperature TATF of the AT 20 as they are.

The pump capacity correcting means 120 corrects a coefficient of a pump capacity Cp calculated by pump capacity (Cp) calculating means 110 on the basis of a coefficient of correction of the pump calculated by pump correction efficient calculating means 125 so as to output a corrected coefficient of the pump capacity Cp'.

Here, a description will be given of the coefficient of correction of the pump calculated by the pump correction efficient calculating means 125 with reference to FIGS. 3 to 8.

At first, a description will be given of a coefficient of correction of the pump capacity coefficient in accordance with the oil temperature of the automatic transmission TATF with reference to FIG. 3.

Figure 3:
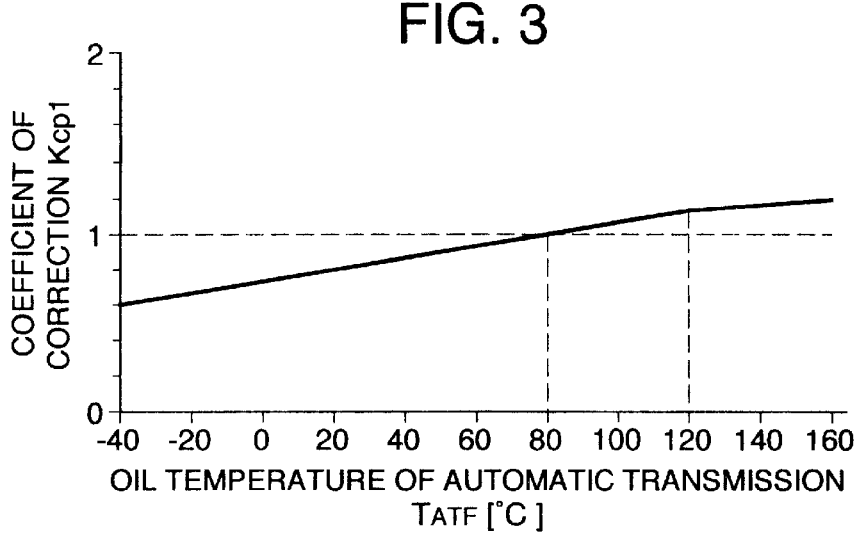
FIG. 3 is a view which explains a coefficient of correction for a coefficient of a pump capacity in accordance with an oil temperature of an automatic transmission used for a control unit of the automatic transmission in accordance with an embodiment of the present invention.

A coefficient of correction Kcp1 of the pump capacity coefficient Cp in accordance with the oil temperature TATF of the automatic transmission becomes as shown in FIG. 3. Then, the coefficient of correction at each of the TATF as shown in FIG. 3 is previously stored in the pump correction coefficient calculating means 125 as table data or stored therein as functional formulas and is calculated on the basis of the TATF. When the pump capacity coefficient after correction is supposed to be Cp', the pump capacity correcting means 120 can calculates in accordance with the following formula (2) on the basis of the pump capacity coefficient Cp calculated by the pump capacity (Cp) calculating means 110 and the coefficient of correction Kcp1.

$$Cp' = Kcp1 \cdot Cp \qquad (2)$$

Next, a description will be given of a coefficient of correction of the pump capacity coefficient on the basis of the engine torque Te with reference to FIG. 4.

Figure 4:
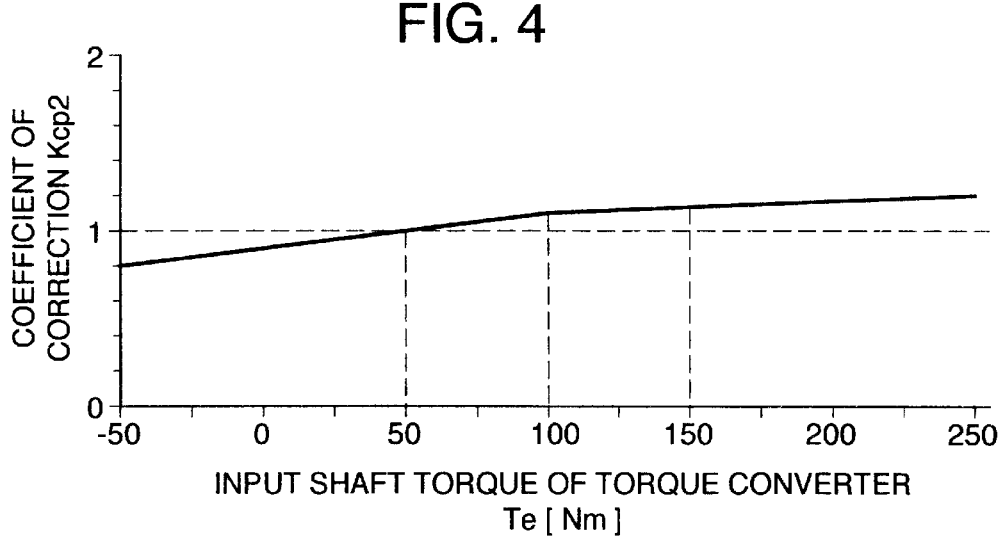
FIG. 4 is a view which explains a coefficient of correction for a coefficient of a pump capacity in accordance with an engine torque Te used for a control unit of an automatic transmission in accordance with an embodiment of the present invention.

A coefficient of correction Kcp2 of the pump capacity coefficient Cp on the basis of the engine torque Te becomes as shown in FIG. 4. Then, the coefficient of correction at each of the Te as shown in FIG. 4 is previously stored in the pump correction coefficient calculating means 125 as table data or stored therein as functional formulas and is calculated on the basis of the Te. When the pump capacity coefficient after correction is supposed to be Cp', the pump capacity correcting means 120 can calculates in accordance with the following formula (3) on the basis of the pump capacity coefficient Cp calculated by the pump capacity (Cp) calculating means 110 and the coefficient of correction Kcp2.

$$Cp' = Kcp2 \cdot Cp \qquad (3)$$

Next, a description will be given of a coefficient of correction of the pump capacity coefficient on the basis of the engine speed Ne with reference to FIG. 5.

Figure 5:
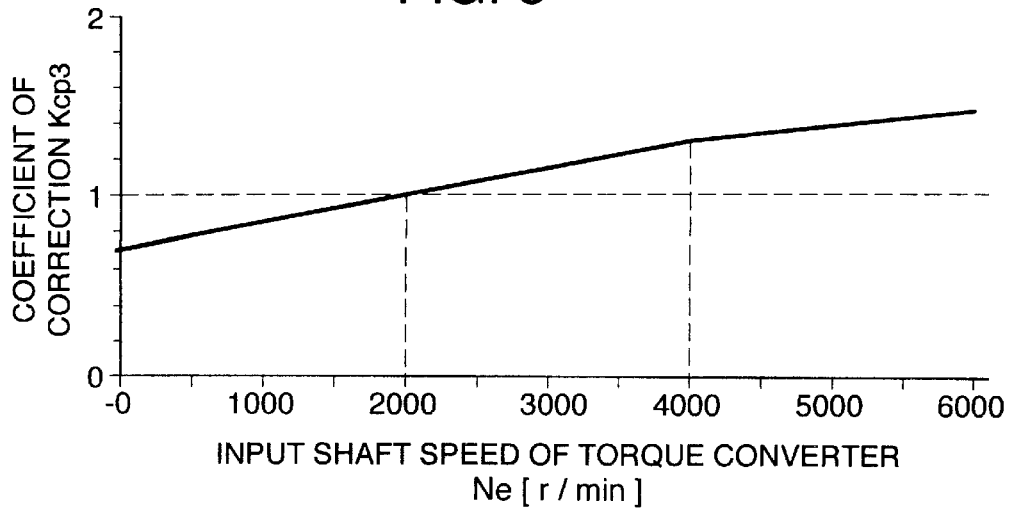
FIG. 5 is a view which explains a coefficient of correction for a coefficient of a pump capacity in accordance with an engine speed Ne used for a control unit of an automatic transmission in accordance with an embodiment of the present invention.

A coefficient of correction Kcp3 of the pump capacity coefficient Cp on the basis of the engine speed Ne becomes as shown in FIG. 5. Then, the coefficient of correction at each of the Ne as shown in FIG. 5 is previously stored in the pump correction coefficient calculating means 125 as table data or stored therein as functional formulas and is calculated on the basis of the Ne. When the pump capacity coefficient after correction is supposed to be Cp', the pump capacity correcting means 120 can calculates in accordance with the following formula (4) on the basis of the pump capacity coefficient Cp calculated by the pump capacity (Cp) calculating means 110 and the coefficient of correction Kcp3.

$$Cp' = Kcp3 \cdot Cp \qquad (4)$$

Next, a description will be given of a coefficient of correction of the pump capacity coefficient on the basis of the torque converter relative velocity difference ΔN with reference to FIG. 6.

Figure 6:
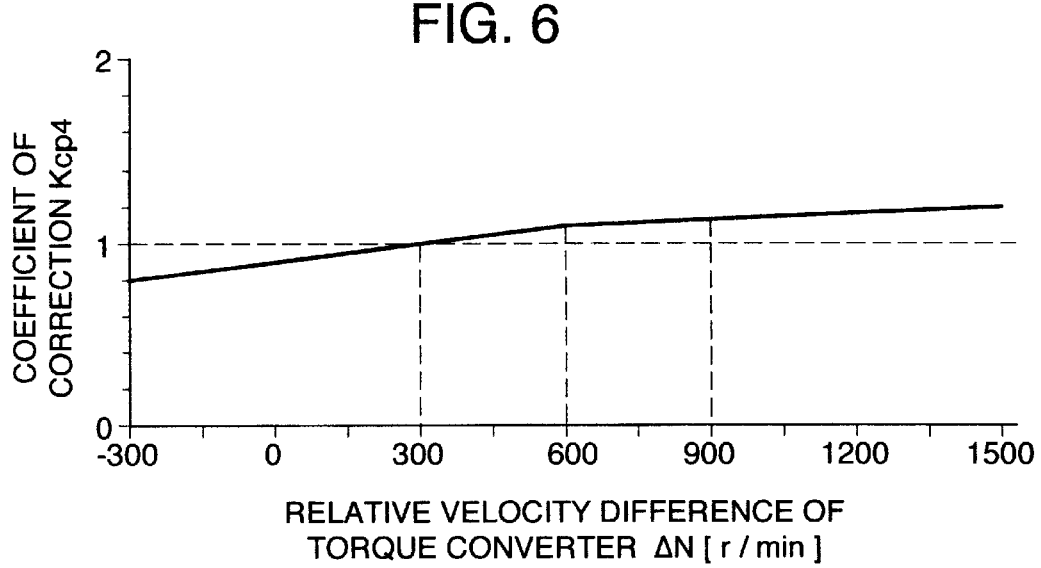
FIG. 6 is a view which explains a coefficient of correction for a coefficient of a pump capacity in accordance with a torque converter relative velocity difference ΔN used for a control unit of an automatic transmission in accordance with an embodiment of the present invention.

A coefficient of correction Kcp4 of the pump capacity coefficient Cp on the basis of the torque converter relative velocity difference ΔN becomes as shown in FIG. 6. Then, the coefficient of correction at each of the ΔN as shown in FIG. 6 is previously stored in the pump correction coefficient calculating means 125 as table data or stored therein as functional formulas and is calculated on the basis of the ΔN. When the pump capacity coefficient after correction is supposed to be Cp', the pump capacity correcting means 120 can calculates in accordance with the following formula (5) on the basis of the pump capacity coefficient Cp calculated by the pump capacity (Cp) calculating means 110 and the coefficient of correction Kcp4.

$$Cp' = Kcp4 \cdot Cp \qquad (5)$$

In this case, in the case that the operating state parameter calculating means 115 outputs the velocity change component ΔVe of the engine speed Ne or the velocity change component ΔVt of the turbine speed Nt in place of the torque converter relative velocity ratio ΔV, the coefficient of correction may be calculated on the basis of the velocity change components Δve and ΔVt and the coefficient of the pump capacity Cp' after correction may be calculated on the basis of the coefficient of correction.

Next, a description will be given of a coefficient of correction of the pump capacity coefficient on the basis of the torque converter relative velocity ratio ΔV with reference to FIG. 7.

Figure 7:
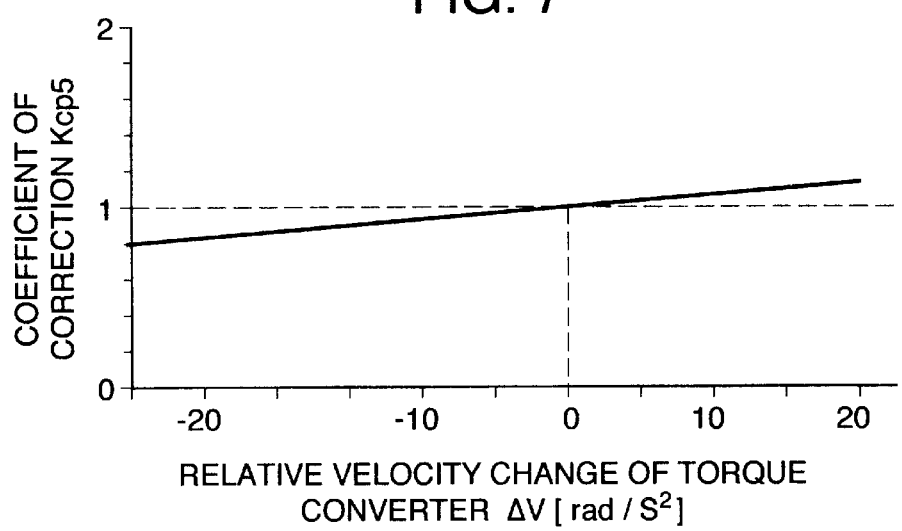
FIG. 7 is a view which explains a coefficient of correction for a coefficient of a pump capacity in accordance with a torque converter relative velocity ratio ΔV used for a control unit of an automatic transmission in accordance with an embodiment of the present invention.

A coefficient of correction Kcp5 of the pump capacity coefficient Cp on the basis of the torque converter relative velocity ratio ΔV becomes as shown in FIG. 7. Then, the coefficient of correction at each of the ΔV as shown in FIG.

7 is previously stored in the pump correction coefficient calculating means 125 as table data or stored therein as functional formulas and is calculated on the basis of the ΔV. When the pump capacity coefficient after correction is supposed to be Cp', the pump capacity correcting means 120 can calculates in accordance with the following formula (6) on the basis of the pump capacity coefficient Cp calculated by the pump capacity (Cp) calculating means 110 and the coefficient of correction Kcp5.

$$Cp'=Kcp5 \cdot Cp \qquad (6)$$

Next, a description will be given of a coefficient of correction of the pump capacity coefficient on the basis of the torque converter driving force ratio R with reference to FIG. 8.

Figure 8:
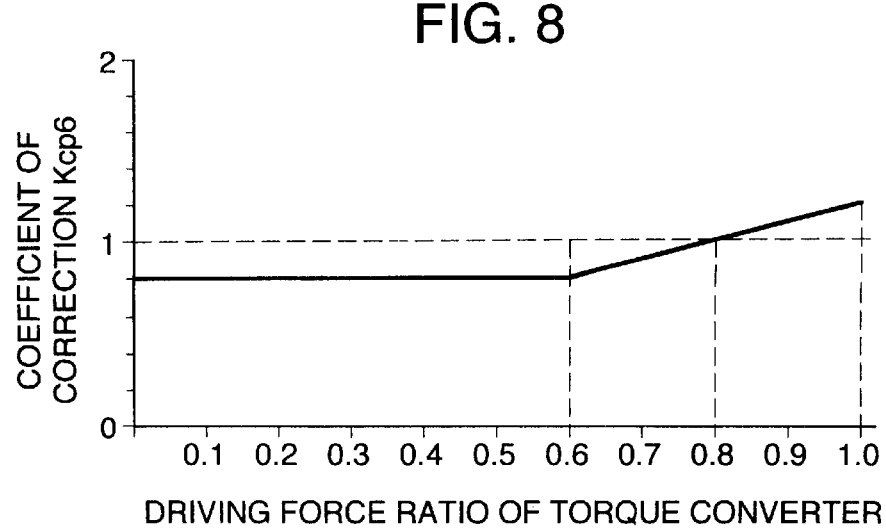
FIG. 8 is a view which explains a coefficient of correction for a coefficient of a pump capacity in accordance with a torque converter driving force ratio R used for a control unit of an automatic transmission in accordance with an embodiment of the present invention.

A coefficient of correction Kcp6 of the pump capacity coefficient Cp on the basis of the torque converter driving force ratio R becomes as shown in FIG. 8. Then, the coefficient of correction at each of the R as shown in FIG. 8 is previously stored in the pump correction coefficient calculating means 125 as table data or stored therein as functional formulas and is calculated on the basis of the R. When the pump capacity coefficient after correction is supposed to be Cp', the pump capacity correcting means 120 can calculates in accordance with the following formula (7) on the basis of the pump capacity coefficient Cp calculated by the pump capacity (Cp) calculating means 110 and the coefficient of correction Kcp6.

$$Cp'=Kcp6 \cdot Cp \qquad (7)$$

In this case, in the case that the operating state parameter calculating means 115 outputs the driving force Le of the torque converter input shaft or the driving force Lt of the torque converter output shaft in place of the torque converter driving force ratio R, the coefficient of correction may be calculated on the basis of the driving forces Le and Lt and the coefficient of the pump capacity Cp' after correction may be calculated on the basis of the coefficient of correction.

In this case, since the pump capacity correcting means 120 performs correction on the basis of each of the coefficients of correction Kcp1, Kcp2, Kcp3, Kcp4, Kcp5 and Kcp6 output by the pump capacity correction efficient calculating means 125, it calculates Cp' in accordance with the following formula (8).

$$Cp'=(Kcp1 \cdot Kcp2 \cdot Kcp3 \cdot Kcp4 \cdot Kcp5 \cdot Kcp6) \cdot Cp \qquad (8)$$

On the contrary, the engine speed square value calculating means 130 calculates the square value Ne² of the engine speed Ne.

An input torque of the torque converter, that is, a pump torque Tp can be expressed by the formula (9).

$$Tp=Cp' \cdot Ne^2 \qquad (9)$$

Then, pump torque (Tp) calculating means 135 calculates the pump torque Tp on the basis of the pump capacity Cp' corrected by the pump capacity correcting means 120 and the square value Ne² of the engine speed Ne calculated by the engine speed square value calculating means 130 in accordance with the formula (9).

On the contrary, torque ratio (t) calculating means 140 calculates the torque ratio t on the basis of the velocity ratio e of the torque converter calculated by the speed ratio (e) calculating means 105 with using a previously stored torque ratio characteristic (e-t characteristic) of the torque converter.

Torque ratio correcting means 145 corrects the pump torque Tp calculated by the pump torque (Tp) calculating means 135 on the basis of the pump correction coefficient calculated by torque ratio correction coefficient calculating means 150 so as to output a corrected pump torque Tp'.

Here, a description will be given of the pump correction efficient calculated by the torque ratio correction efficient calculating means 150 with reference to FIGS. 9 to 14.

At first, a description will be given of a coefficient of correction of the torque ratio coefficient in accordance with the oil temperature TATF of the automatic transmission with reference to FIG. 9.

Figure 9:
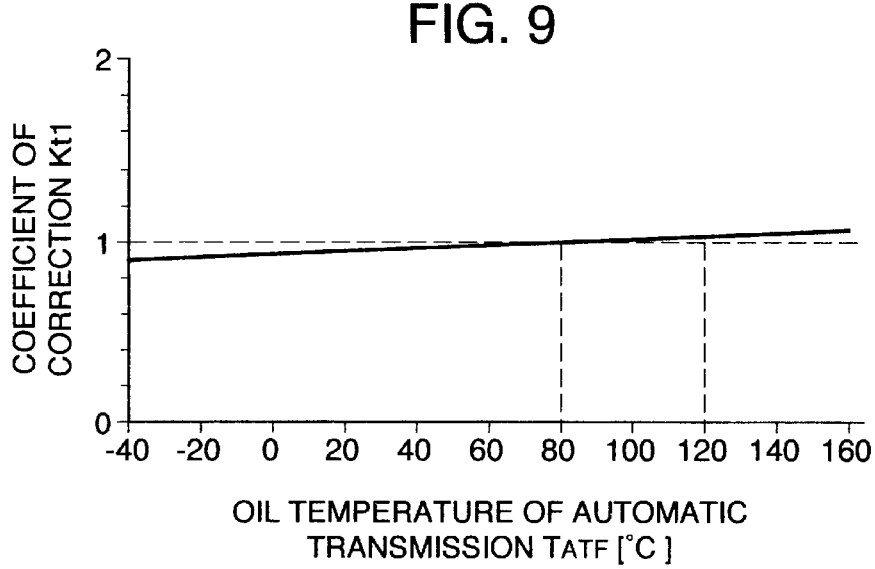
FIG. 9 is a view which explains a coefficient of correction for a coefficient of a coefficient of a torque ratio in accordance with an oil temperature of an automatic transmission used for a control unit of the automatic transmission in accordance with an embodiment of the present invention.

A coefficient of correction Kt1 of the torque ratio coefficient t in accordance with the oil temperature TATF of the automatic transmission becomes as shown in FIG. 9. Then, the coefficient of correction at each of the TATF as shown in FIG. 9 is previously stored in the torque ratio coefficient calculating means 150 as table data or stored therein as functional formulas and is calculated on the basis of the TATF. When the torque ratio coefficient after correction is supposed to be t', the torque ratio correcting means 145 can calculates in accordance with the following formula (11) on the basis of the torque ratio coefficient t calculated by the torque ratio (t) calculating means 140 and the coefficient of correction Kt1.

$$t'=Kt1 \cdot t \qquad (10)$$

Next, a description will be given of a coefficient of correction of the torque ratio coefficient on the basis of the engine torque Te with reference to FIG. 10.

Figure 10:
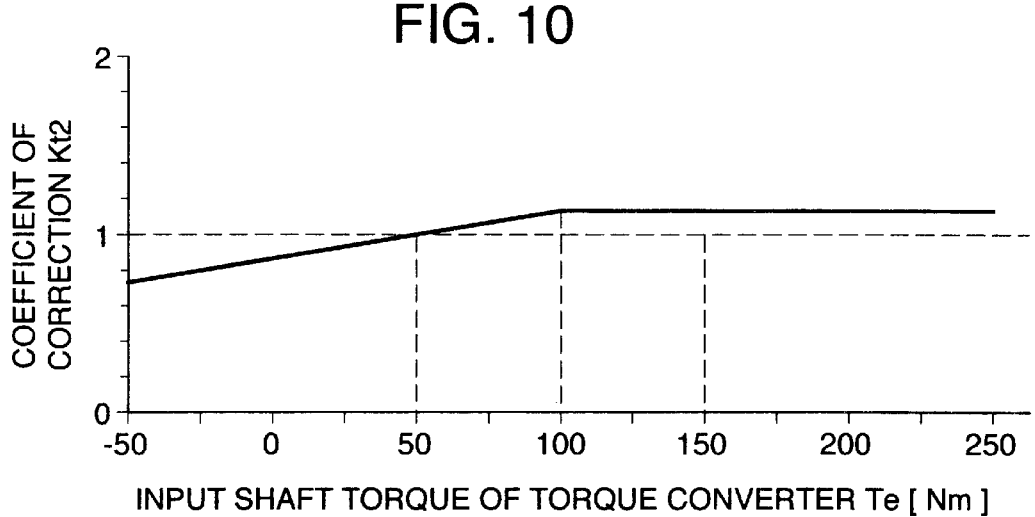
FIG. 10 is a view which explains a coefficient of correction for a coefficient of a torque ratio in accordance with an engine torque Te used for a control unit of an automatic transmission in accordance with an embodiment of the present invention.

A coefficient of correction Kt2 of the torque ratio coefficient t on the basis of the engine torque Te becomes as shown in FIG. 10. Then, the coefficient of correction at each of the Te as shown in FIG. 10 is previously stored in the torque ratio correction coefficient calculating means 150 as table data or stored therein as functional formulas and is calculated on the basis of the Te. When the torque ratio coefficient after correction is supposed to be t', the torque ratio correcting means 145 can calculates in accordance with the following formula (11) on the basis of the torque ratio coefficient t calculated by the torque ratio (t) calculating means 140 and the coefficient of correction Kt2.

$$t'=Kt2 \cdot t \qquad (11)$$

Next, a description will be given of a coefficient of correction of the torque ratio coefficient on the basis of the engine speed Ne with reference to FIG. 11.

Figure 11:
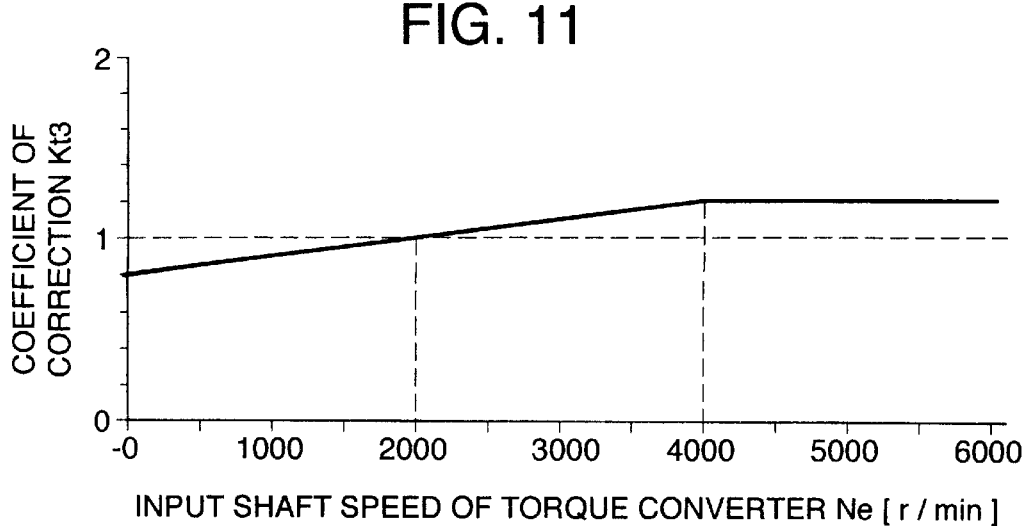
FIG. 11 is a view which explains a coefficient of correction for a coefficient of a torque ratio in accordance with an engine speed Ne used for a control unit of an automatic transmission in accordance with an embodiment of the present invention.

A coefficient of correction Kt3 of the torque ratio coefficient t on the basis of the engine speed Ne becomes as shown in FIG. 11. Then, the coefficient of correction at each of the Ne as shown in FIG. 11 is previously stored in the torque ratio correction coefficient calculating means 150 as table data or stored therein as functional formulas and is calculated on the basis of the Ne. When the torque ratio coefficient after correction is supposed to be t', the torque ratio correcting means 145 can calculates in accordance with the following formula (12) on the basis of the torque ratio coefficient t calculated by the torque ratio (t) calculating means 140 and the coefficient of correction Kt3.

$$t'=Kt3 \cdot t \qquad (12)$$

Next, a description will be given of a coefficient of correction of the torque ratio coefficient on the basis of the torque converter relative velocity difference ΔN with reference to FIG. 12.

Figure 12:
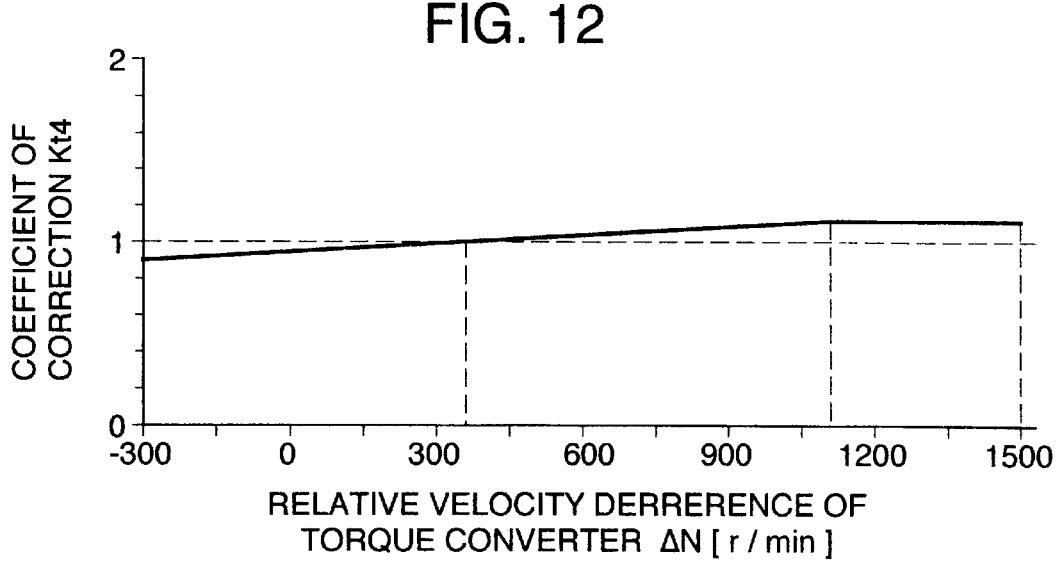
FIG. 12 is a view which explains a coefficient of correction for a coefficient of a torque ratio in accordance with a torque converter relative velocity difference ΔN used for a control unit of an automatic transmission in accordance with an embodiment of the present invention.

A coefficient of correction Kt4 of the torque ratio coefficient t on the basis of the torque converter relative velocity difference ΔN becomes as shown in FIG. 12. Then, the coefficient of correction at each of the ΔN as shown in FIG. 12 is previously stored in the torque ratio correction coefficient calculating means 150 as table data or stored therein as functional formulas and is calculated on the basis of the ΔN. When the torque ratio coefficient after correction is supposed to be t', the torque ratio correcting means 145 can calculates in accordance with the following formula (13) on the basis of the torque ratio coefficient t calculated by the torque ratio (t) calculating means 140 and the coefficient of correction Kt4.

$$t'=Kt4 \cdot t \tag{13}$$

In this case, in the case that the operating state parameter calculating means 115 outputs the velocity change component ΔVe of the engine speed Ne or the velocity change component ΔVt of the turbine speed Nt in place of the torque converter relative velocity ratio ΔV, the coefficient of correction may be calculated on the basis of the velocity change components Δve and ΔVt and the coefficient of the torque ratio t' after correction may be calculated on the basis of the coefficient of correction.

Next, a description will be given of a coefficient of correction of the torque ratio coefficient on the basis of the torque converter relative velocity ratio ΔV with reference to FIG. 13.

Figure 13:
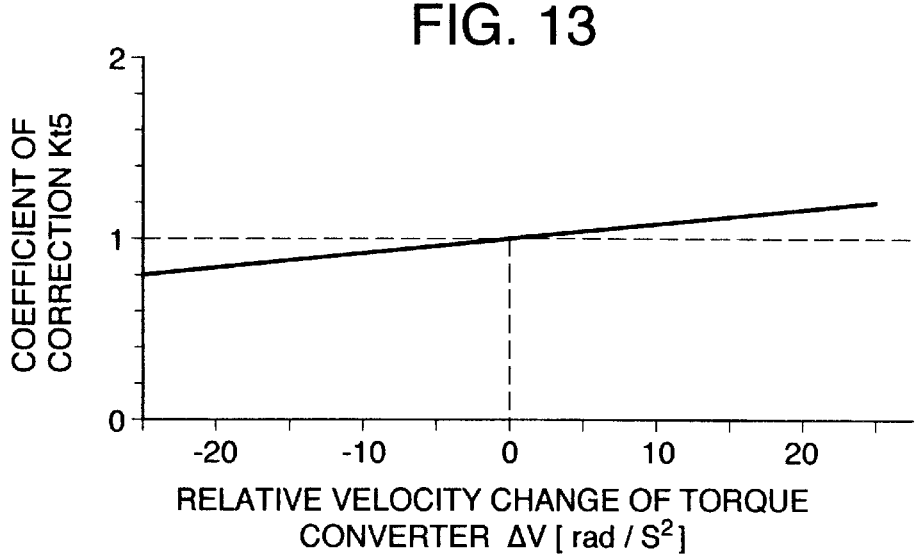
FIG. 13 is a view which explains a coefficient of correction for a coefficient of a torque ratio in accordance with a torque converter relative velocity ratio ΔV used for a control unit of an automatic transmission in accordance with an embodiment of the present invention.

A coefficient of correction Kt5 of the torque ratio coefficient t on the basis of the torque converter relative velocity ratio ΔV becomes as shown in FIG. 13. Then, the coefficient of correction at each of the ΔV as shown in FIG. 13 is previously stored in the torque ratio correction coefficient calculating means 150 as table data or stored therein as functional formulas and is calculated on the basis of the ΔV. When the torque ratio coefficient after correction is supposed to be t', the torque ratio correcting means 145 can calculates in accordance with the following formula (14) on the basis of the torque ratio coefficient t calculated by the torque ratio (t) calculating means 140 and the coefficient of correction Kt5.

$$t'=Kt5 \cdot t \tag{14}$$

Next, a description will be given of a coefficient of correction of the torque ratio coefficient on the basis of the torque converter driving force ratio R with reference to FIG. 14.

Figure 14:
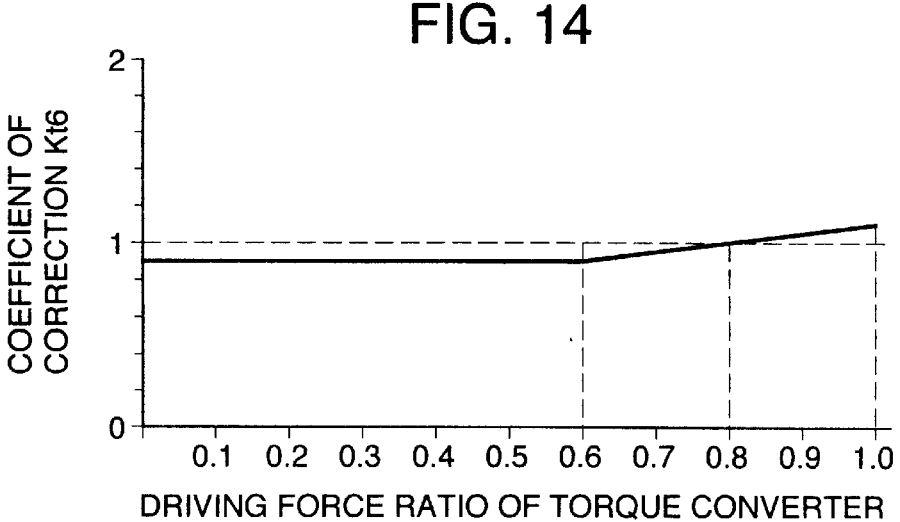
FIG. 14 is a view which explains a coefficient of correction for a coefficient of a torque ratio in accordance with a torque converter driving force ratio R used for a control unit of an automatic transmission in accordance with an embodiment of the present invention.

A coefficient of correction Kt6 of the torque ratio coefficient t on the basis of the torque converter driving force ratio R becomes as shown in FIG. 14. Then, the coefficient of correction at each of the R as shown in FIG. 14 is previously stored in the torque ratio correction coefficient calculating means 150 as table data or stored therein as functional formulas and is calculated on the basis of the R. When the torque ratio coefficient after correction is supposed to be t', the torque ratio correcting means 145 can calculates in accordance with the following formula (15) on the basis of the torque ratio coefficient t calculated by the torque ratio (t) calculating means 140 and the coefficient of correction Kt6.

$$t'=Kt6 \cdot t \tag{15}$$

In this case, in the case that the operating state parameter calculating means 115 outputs the driving force Le of the torque converter input shaft or the driving force Lt of the torque converter output shaft in place of the torque converter driving force ratio R, the coefficient of correction may be calculated on the basis of the driving forces Le and Lt and the coefficient of the torque ratio t' after correction may be calculated on the basis of the coefficient of correction.

In this case, since the torque ratio correcting means 145 performs correction on the basis of each of the coefficients of correction Kt1, Kt2, Kt3, Kt4, Kt5 and Kt6 output by the torque ratio correction efficient calculating means 150, it calculates t' in accordance with the following formula (16).

$$t'=(Kt1 \cdot Kt2 \cdot Kt3 \cdot Kt4 \cdot Kt5 \cdot Kt6) \cdot t \tag{16}$$

Turbine torque (Tt) calculating means 155 calculates a torque converter output shaft torque (an input torque to a gear train), that is, a turbine torque Tt on the basis of the pump torque Tp' calculated by the pump torque (Tp) calculating means 135 and the torque ratio coefficient t corrected by the torque ratio correcting means 145 in accordance with the formula (17).

$$Tt=t' \cdot Tp' \tag{17}$$

On the contrary, the gear ratio (r) calculating means 160 inputs a gear position signal Gp and calculates the gear ratio r.

The output shaft torque (To) calculating means 165 calculates the automatic transmission output shaft torque To on the basis of the turbine torque Tt calculated by the turbine torque (Tt) calculating means 155 and the gear ratio r (Gp) calculated by the gear ratio (r) calculating means 160 in accordance with the formula (18).

$$To=Tt \cdot r \,(Gp) \tag{18}$$

The drive wheel torque (TD) calculating means 175 calculates the drive wheel torque TD on the basis of the automatic transmission output shaft torque To calculated by the output shaft torque (To) calculating means 165 and the final reduction ratio rf previously stored in the final reduction ratio storing means 170 in accordance with the formula (19).

$$TD=To \cdot rf \tag{19}$$

As mentioned above, it is possible to calculate the pump torque Tp, the corrected pump torque Tp', the turbine torque Tt, the corrected turbine torque Tt', the automatic transmission output shaft torque To and the drive wheel torque TD by taking the engine speed Ne and the turbine speed Nt at each of a predetermined time (for example, 10 msec) and utilizing the torque converter characteristic, thereby estimating the torque substantially at an actual time.

As mentioned above, in accordance with the present embodiment, since the structure is made such that a correction is performed by using the parameters expressing the operation state such as the input shaft torque of the torque converter, the input shaft speed in the torque converter, the relative velocity difference between the input shaft and the output shaft in the torque converter, the relative velocity change between the input shaft and the output shaft in the torque converter and the when calculating the torque converter output shaft torque, the driving force ratio between the input shaft and the output shaft in the torque converter and the like as well as the automatic transmission oil temperature when calculating the torque converter output shaft torque, it is possible to further accurately estimate the torque converter output shaft torque.

Here, in the description mentioned above, the structure is made such that the output shaft torque of the torque converter is calculated by using six parameters expressing the operating state, the parameters comprising the oil temperature of the automatic transmission, the input shaft torque of the torque converter, the input shaft speed in the torque converter, the relative velocity difference between the input shaft and the output shaft in the torque converter, the relative velocity change between the input shaft and the output shaft in the torque converter and the driving force ratio between the input shaft and the output shaft in the torque converter, however, the present embodiment is not limited to this, since the output shaft torque of the torque converter is calculated by using at least one of five parameters expressing the operating state, the parameters comprising the input shaft torque of the torque converter, the input shaft speed in the torque converter, the relative velocity difference between the input shaft and the output shaft in the torque converter, the relative velocity change between the input shaft and the output shaft in the torque converter and the driving force ratio between the input shaft and the output shaft in the torque converter in addition to the oil temperature of the automatic transmission, it is possible to improve the calculating accuracy in comparison with the case that the output shaft torque of the torque converter is calculated by using only the oil temperature of the automatic transmission.

Further, the structure is made such that both of the pump capacity coefficient Cp and the torque ratio t are corrected at a time of calculating the output shaft torque of the torque converter, however, it is possible to improve the correcting accuracy in the case of correction of only any one of them.

As mentioned above, in accordance with the present invention, it is possible to reduce an error in the output shaft torque of the torque converter and accurately estimate the output shaft torque of the torque converter.

What is claimed is:

1. A control unit of an automatic transmission having torque estimating means for estimating an output shaft torque in a torque converter using a characteristic of the torque converter and controlling the automatic transmission by using the estimated torque converter output shaft torque, wherein said torque estimating means corrects at least one of a pump capacity characteristic and a torque ration characteristic of the torque converter by using an oil temperature of the automatic transmission and at least one of parameters expressing an operating state, and parameters comprising a torque of an input of the torque converter, an input shaft speed in the torque converter, a relative velocity difference between the input shaft and the output shaft in the torque converter, a velocity change component of the input shaft in the torque converter, a velocity change component of the output shaft in the torque converter, a relative velocity change component of the input shaft and the output shaft in the torque converter, a driving force of the output shaft in the torque converter, and a ratio of the driving forces between the input shaft and the output shaft in the torque converter, thereby estimating the torque converter output shaft torque.

2. A control unit of an automatic transmission as claimed in claim 1, wherein said torque estimating means calculates engine torque te on the basis of an engine speed Ne and a throttle valve opening TVO.

3. A control unit of an automatic transmission as claimed in claim 1, wherein said torque estimating means calculates a difference of a relative speed $\Delta N$ of the torque converter on the basis of a difference between an engine speed Ne and a turbine speed Nt.

4. A control unit of an automatic transmission as claimed in claim 1, wherein said torque estimating means converts an engine speed Ne into an angular velocity, calculates a velocity change component $\Delta Ve$ of an engine speed Ne by taking a time differentiation, calculates a velocity change component $\Delta Vt$ of a turbine speed Nt and calculates a torque converter relative velocity ratio $\Delta V$ on the basis of a difference between the velocity change component $\Delta Ve$ of the engine speed Ne and the velocity change component $\Delta Vt$ of the turbine speed Nt.

5. A control unit of an automatic transmission as claimed in claim 1, wherein said torque estimating means calculates an engine torque Te on the basis of an engine speed Ne and a throttle valve opening TVO, calculates a driving force Le of an input shaft of the torque converter by multiplying the calculated engine torque Te by an angular velocity $\omega e$ of the torque converter input shaft, calculates a driving force Lt of an output shaft of the torque converter by multiplying a pump capacity coefficient Cp0 and a torque ration t0 calculated on the basis of a velocity ration e between the engine speed and the number of rotation in the torque converter by a square value $Ne^2$ of the engine speed and an angular velocity $\omega t$ of the torque converter output shaft, and calculates a torque converter driving force ration R on the basis of a ration between the driving force Le of the torque converter input shaft and the driving force Lt of the torque converter output shaft.

6. A control method of an automatic transmission comprising the steps of estimating an output shaft torque in a torque converter using a characteristic of the torque converter and controlling the automatic transmission by using the estimated torque converter output shaft torque, wherein the improvement comprises a step of correcting at least one of a pump capacity characteristic and a torque ratio characteristic of the torque converter by using an oil temperature of the automatic transmission and at least one of five parameters expressing an operating state, said parameters comprising a torque of an input of the torque converter, an input shaft speed in the torque converter, a relative velocity difference between the input shaft and the output shaft in the torque converter, a relative velocity change of the input shaft and the output shaft in the torque converter, and a ration of driving forces between the input shaft and the output shaft in the torque converter, thereby estimating the torque converter output shaft torque.

7. A control unit of an automatic transmission configured for inputting an engine rotational speed Ne and a throttle opening degree TVO measured in an engine in which an output shaft for transmitting an engine power is connected to an input shaft of a torque converter and in which sensors detecting the engine rotational speed Ne and the throttle opening degree TVO are mounted, performing a power transmission based on an output shaft of the torque converter input to the automatic transmission, inputting a turbine rotational speed Nt measured in the automatic transmission in which a sensor detecting an output shaft rotational speed Nt of the torque converter is mounted, having torque estimating means for estimating an output shaft torque in a torque converter using a characteristic of the torque converter and controlling the automatic transmission by using the estimated torque converter output shaft torque, wherein said torque estimating means corrects at lest one of a pump capacity characteristic and a torque ratio characteristic of the torque converter by using an oil temperature of the automatic transmission and at least one of parameters expressing an operating state, said parameters comprising a torque of an input of the torque converter, an input shaft speed in the torque converter, a relative velocity difference between the input shaft and the output shaft in the torque converter, a velocity change component of the input shaft in the torque converter, a velocity change component of the output shaft in the torque converter, a relative velocity change component of the input shaft and the output shaft in the torque converter, a driving force of the input shaft in the torque converter, a driving force of the output shaft in the torque converter, and a ratio of the driving forces between the input shaft and the output shaft in the torque converter, thereby estimating the torque converter output shaft torque.

* * * * *